(12) United States Patent
Klostermann et al.

(10) Patent No.: US 11,155,163 B2
(45) Date of Patent: Oct. 26, 2021

(54) METHOD FOR ASSEMBLING A CLUTCH CONTROL UNIT IN A TRANSMISSION CLUTCH HOUSING

(71) Applicant: VOLVO TRUCK CORPORATION, Gothenburg (SE)

(72) Inventors: André Luís Klostermann, Torslanda (SE); Pär Öhrfeldt, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 18 days.

(21) Appl. No.: 16/605,697

(22) PCT Filed: May 4, 2017

(86) PCT No.: PCT/EP2017/060598
§ 371 (c)(1),
(2) Date: Oct. 16, 2019

(87) PCT Pub. No.: WO2018/202296
PCT Pub. Date: Nov. 8, 2018

(65) Prior Publication Data
US 2020/0114758 A1    Apr. 16, 2020

(51) Int. Cl.
*F16H 57/02* (2012.01)
*B60K 23/02* (2006.01)
(Continued)

(52) U.S. Cl.
CPC .......... *B60K 23/02* (2013.01); *F16H 57/025* (2013.01); *F16D 48/00* (2013.01); *F16D 2300/26* (2013.01); *F16H 2057/02047* (2013.01)

(58) Field of Classification Search
CPC .................................... B60K 23/02–2023/025
See application file for complete search history.

(56) References Cited

U.S. PATENT DOCUMENTS 6,029,789 A * 2/2000 Lindner ................. B60K 23/02
                                                            192/85.49
6,609,438 B1 * 8/2003 Bigham .................. G05G 1/30
                                                            74/512
(Continued)

FOREIGN PATENT DOCUMENTS

| EP | 0791770 A2 | 8/1997 |
| EP | 1251417 A1 | 10/2002 |
| GB | 334894 A | 9/1930 |

OTHER PUBLICATIONS

International Search Report and Written Opinion dated Jan. 12, 2018, in International Application No. PCT/EP2017/060598.

*Primary Examiner* — David R Morris
*Assistant Examiner* — Lillian T Nguyen
(74) *Attorney, Agent, or Firm* — Venable LLP; Jeffri A. Kaminski

(57) ABSTRACT

A method for assembling a clutch control unit in a transmission clutch housing of a vehicle, the method comprising the steps of coupling the clutch control unit to the transmission clutch housing by a first guide means comprising a first pin and a first slot; coupling the clutch control unit to the transmission clutch housing by a second guide means comprising a second pin and a second slot; and displacing the clutch control unit from a first position at least partially outside the transmission clutch housing to an operative second position within the transmission clutch housing.

10 Claims, 5 Drawing Sheets

(51) Int. Cl.
    *F16H 57/025*    (2012.01)
    *F16D 48/00*    (2006.01)

(56) References Cited

U.S. PATENT DOCUMENTS

2002/0002874 A1* 1/2002 Burton .................. G05G 1/405
                                                    74/512
2009/0025505 A1* 1/2009 Booher .................. G05G 1/405
                                                    74/512

* cited by examiner

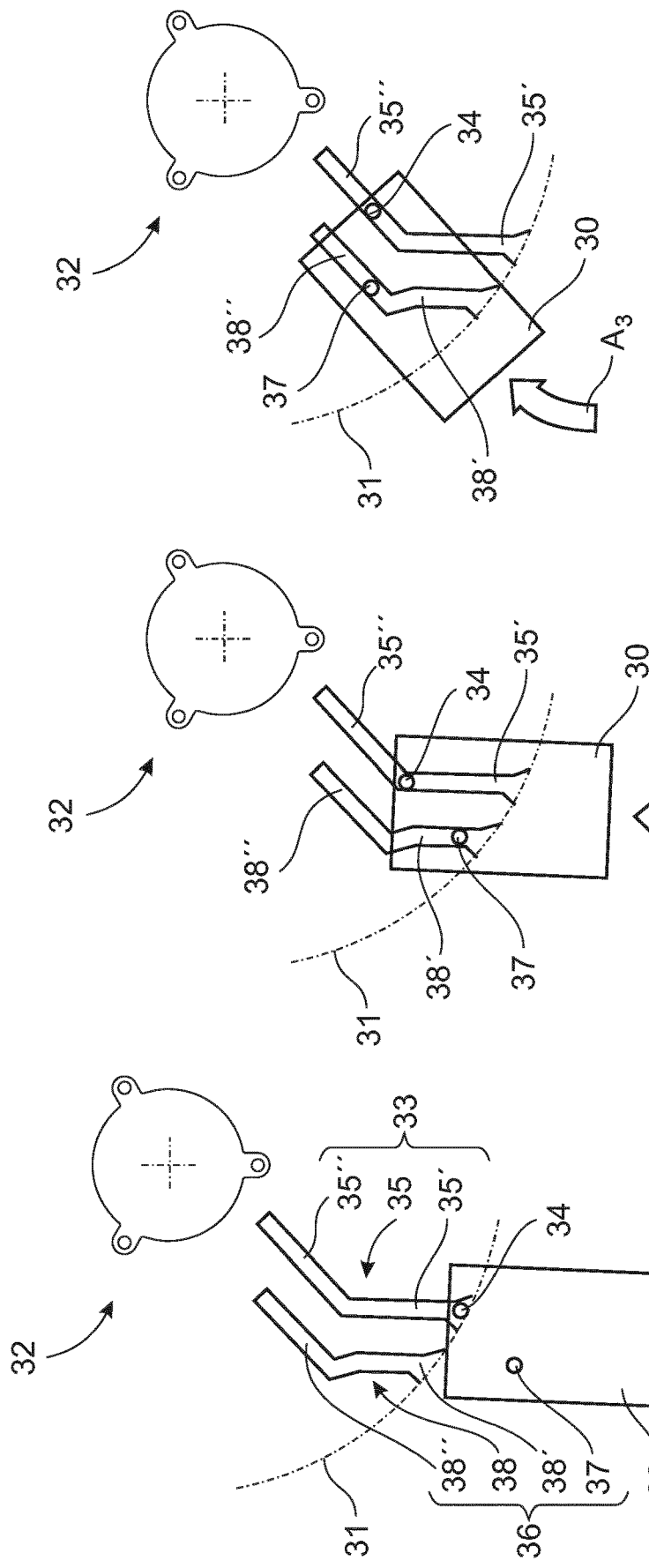

METHOD FOR ASSEMBLING A CLUTCH CONTROL UNIT IN A TRANSMISSION CLUTCH HOUSING

TECHNICAL FIELD

The invention relates to a method for assembling a clutch control unit in a transmission clutch housing of a vehicle, as well as a transmission clutch housing and a clutch control unit to be mounted using this method.

The invention can be applied in heavy-duty vehicles, such as trucks, buses and construction equipment. Although the invention will be described with respect to a commercial vehicle, such as a truck, the invention is not restricted to this particular vehicle, but may also be used in other vehicles such as but may also be used in other vehicles such as articulated haulers, wheel loaders, and other working machines.

BACKGROUND

Commercial vehicle transmission can be provided with a clutch control unit (CCU), such as a clutch valve unit (CVU), for supplying fluid pressure and controlling a clutch actuation cylinder e.g. in an automated mechanical transmission (AMT) or in clutch by wire systems. The clutch control unit can also be provided with means for integration of additional functions such as transmitting sensor signals through an integrated cable harness to an electronic transmission control unit. Optionally, routing of the fluid pressure for operating the clutch and controlling gear shifting can be integrated into a clutch control unit mounted at the transmission housing base adjacent the clutch housing.

This location of the clutch control unit can make assembly and servicing of the unit difficult, as it is mounted inside the transmission housing adjacent the clutch. During assembly and disassembly, it is necessary to move the clutch control unit in different directions while installing it inside the clutch housing which can be difficult due to the limited space available between the gearbox and surrounding components. As a rule, it is not possible to install the clutch control unit in a straight line from the outside of the transmission housing. At the same time, it is also critical to find the correct position between the clutch control unit and the clutch housing, such as a clutch concentric actuator (CCA) to avoid fluid leakage through any connections between fluid connectors on the clutch control unit and corresponding fluid connectors on the clutch housing. Correct positioning is also important to allow proper function of sensors, such as a clutch position sensor, and to make dust sealing possible between the units. Current systems may require special tools to allow a mechanic to correctly position the clutch control unit by hand.

Hence it is desirable to provide an improved method and arrangement for assembling a clutch control unit in a transmission clutch housing in order to overcome the above problems.

SUMMARY

An object of the invention is to provide a method and an arrangement for assembling a clutch control unit in a transmission clutch housing, which method and arrangement is described in the appended claims.

In the subsequent text the invention is described in relation to a transmission comprising a stepped gearing. Non-limiting examples of suitable transmissions for the intended purpose are semi-automatic transmissions (SAT), automatic transmissions (AT) and automated mechanical transmissions (AMT).

The object is achieved by a method according to claim 1. According to a preferred example, the invention relates to a method for assembling a clutch control unit in a transmission clutch housing of a vehicle. The method comprises the steps of:
- coupling the clutch control unit to the transmission clutch housing by a first guide means comprising a first pin and a first slot;
- coupling the clutch control unit to the transmission clutch housing by a second guide means comprising a second pin and a second slot; and
- displacing the clutch control unit from a first position at least partially outside the transmission clutch housing to an operative second position within the transmission clutch housing;

wherein the clutch control unit is guided by the first and second guide means along a predetermined displacement path during the displacement between the first position and the second position. The paths of the respective guide means are separated over their entire extension.

When located in the above-mentioned operative, second position the clutch control unit is fixed to the clutch housing to supply at least a clutch cylinder and a counter shaft brake actuator with fluid pressure via suitable fluid connectors. In this position, the clutch control unit is also connected to at least one sensor in the transmission via suitable electrical connectors. For instance, a clutch position sensor can be connected to an electronic transmission control unit via the clutch control unit and a wire harness connecting the clutch control unit and the electronic transmission control unit.

The displacement of the clutch control unit from the first position at least partially outside the transmission clutch housing to the operative second position within the transmission clutch housing involves displacing the clutch control unit along a predetermined displacement path that is at least partially non-linear.

The assembly process involves displacing the clutch control unit in a radial plane relative to the rotational axis of a clutch enclosed by the transmission clutch housing. An initial displacement during assembly involves aligning connectors on the clutch control unit with corresponding mating connectors within the transmission clutch housing as the clutch control unit is displaced from the first position towards the second position.

When assembling the clutch control unit into the transmission clutch housing, the clutch control unit insertion direction can be from a first position below the transmission clutch housing as mounted in the vehicle. This is often the case when the engine and transmission is mounted between beams making up the vehicle chassis. This area of the vehicle is often provided with various accessories and supports or brackets for mounting them, which can make access difficult from any other direction.

The direction of the clutch control unit in the mounted operative, second position can be offset 10°-90° relative to the insertion direction from the first position, depending on the internal layout of components within the housing. This angle can be measured relative to the rotary axis of the clutch to be controlled by the clutch control unit. The insertion direction is selected depending on suitable positions for access in relation to the operative position of the clutch control unit. For example, if installation in the vehicle may only be possible from a first position directly below the gearbox at 90° from the horizontal plane. The clutch control unit (CCU) is then displaced from the first position to a second position, where it can be installed and fixed in a position around 30° to 80° below the horizontal plane. Assembly of a clutch control unit during manufacturing of the gearbox or maintenance of the vehicle at a dealer or workshop is guided to the correct position using the inventive method. This is particularly useful on the aftermarket where the clutch control unit installation position is not visible from outside and where a mechanic can be unfamiliar with the disassembly/assembly process. Each guide means comprises cooperating portions, such as shaped projections or pins on the clutch control unit guided by slots or rails in the clutch housing, or vice versa. The guide means allows the clutch control unit to be guided along a displacement path out of and into the installation position without use of specialist tools.

The invention further relates to a transmission clutch housing in a vehicle transmission comprising a clutch control unit mounted using the assembly method as described above. The transmission clutch housing and the clutch control unit are provided with cooperating guide means comprising a first guide means comprising at least a first pin and a first slot arranged in facing surfaces of the transmission clutch housing and the clutch control unit, respectively; and a second guide means comprising at least a second pin and a second slot arranged in facing surfaces of the transmission clutch housing and the clutch control unit, respectively, on one or both sides thereof. Within the scope of the invention, one component can be provided with pins only, while the other component comprises slots only. Alternatively, a combination of pins and slots can be provided on either component, on one or both sides thereof.

The first and second guide means are arranged to define a predetermined displacement path followed by the clutch control unit during assembly of the clutch control unit into its operative position in the transmission clutch housing. The first and second slots defining the predetermined displacement path are at least partially non-linear. The respective guide paths can comprise a combination of straight sections, curved sections, or both straight and curved section. The exact shape of the respective guide path is determined by the available space through which the clutch control unit must pass during the displacement from the first to the second position, or vice versa. In addition, the first and second slots can comprise parallel and non-parallel segments.

In order to facilitate assembly or disassembly, the clutch valve can be arranged between spaced apart, facing first and second surfaces in the transmission clutch housing, which surfaces are located in radial planes relative to the rotational axis of a clutch enclosed by the transmission clutch housing. As indicated above, at least one side of the clutch control unit comprises a first guide means, such as a pin/slot or slot/pin combination. Further, at least one side of the clutch control unit comprises a second guide means, such as a pin/slot or slot/pin combination. Consequently, a clutch control unit can comprise a first and a second guide means on one side, a first and a second guide means on opposite sides, or a first and a second guide means on both sides of the housing. When located on the same side of the clutch control unit or the transmission clutch housing, the first and second slots are spaced apart along their entire extension.

The invention further relates to a clutch control unit in a transmission clutch housing in a vehicle transmission, which clutch control unit is arranged to be inserted into the transmission clutch housing from a first position at least partially outside the transmission clutch housing to an operative second position within the transmission clutch housing. The clutch control unit is provided with one part of a first guide means comprising a first pin or a first slot and one part of a second guide means comprising a second pin or a second slot. Similarly, the transmission clutch housing is provided with the corresponding parts of the first guide means and the second guide means. The first and second guide means are arranged to define a predetermined displacement path followed by the clutch control unit during assembly of the clutch control unit into its operative position in the transmission clutch housing.

According to the invention, one part of the first guide means can be provided on one or on opposite sides of the clutch control unit. Similarly, one part of the second guide means can be provided on one or on opposite sides of the clutch control unit.

Depending on the material used in the respective component part, the slots can be shaped, injection moulded, machined, cast or forged into the component housing during its manufacture. Similarly, the pins can be shaped, removably of fixedly attached, injection moulded, machined, cast or forged onto the component housing during its manufacture.

The invention also relates to a vehicle comprising a transmission clutch housing with a clutch control unit as described in the above examples.

An advantage of the method according the invention is that it facilitates the displacement of the clutch control unit in different directions along a desired displacement path while installing it inside the transmission clutch housing. This displacement can be difficult due to the limited space available between the gearbox and surrounding components, as it is not possible to install the clutch control unit in a straight line from the outside of the transmission housing.

The method allows for simple manoeuvring in different directions during mounting, making use of empty space inside the gearbox clutch housing to avoid collision with other components. This significantly shortens the time required for assembling or servicing the clutch control unit.

A further advantage is that correct positioning of the clutch control unit in relation to the transmission clutch housing is assured. This is an important feature, as it is critical to find the correct position between the clutch control unit and the clutch housing, such as a clutch concentric actuator (CCA) to avoid fluid leakage through any connections between fluid connectors on the clutch control unit and corresponding fluid connectors on the clutch housing. At the same time, correct positioning of sensor connectors and proper dust sealing between the units is ensured. The assembly can be performed without requiring special tools and allows a mechanic to correctly position the clutch control unit by hand. This is particularly advantageous when assembling the CCU from below the truck for ease of access. Hence, correct assembly can be performed even if the mechanic is unfamiliar with the layout of the transmission clutch housing being serviced Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3A-C show a schematic illustration of subsequent steps of an assembly procedure according to the invention;

DETAILED DESCRIPTION OF EXAMPLE EMBODIMENTS OF THE INVENTION

Figure 1:
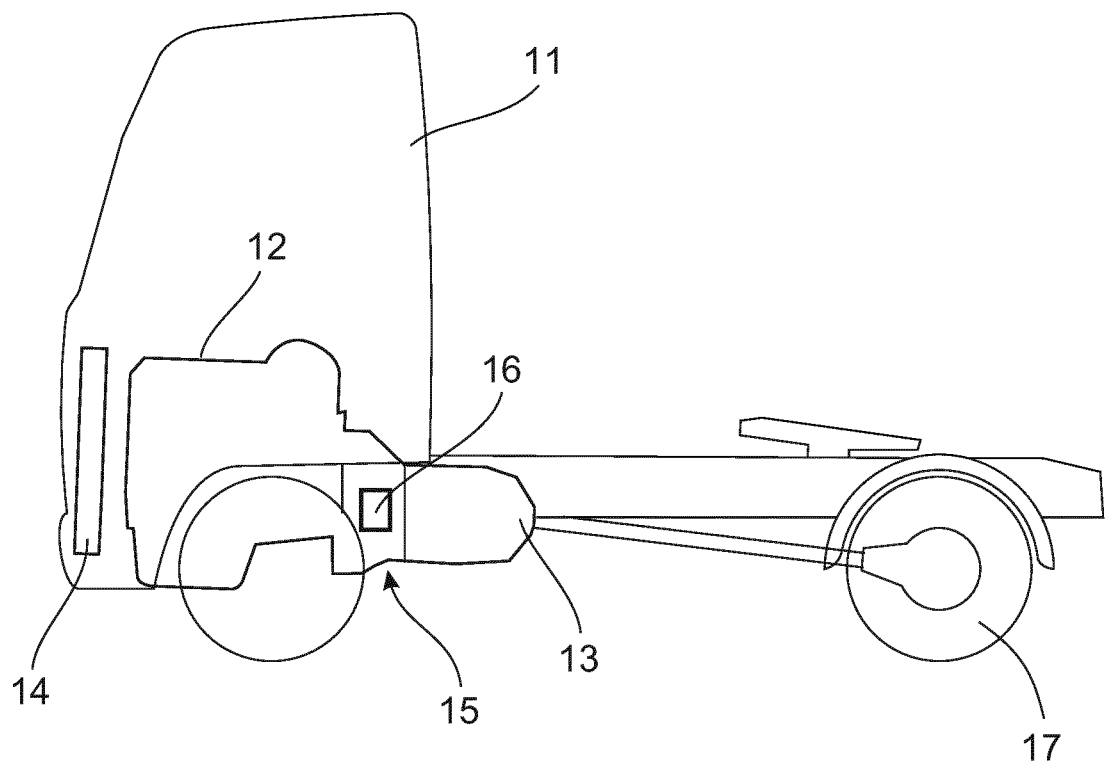
FIG. 1 shows a schematically indicated vehicle with a transmission arrangement for use with a method according to the invention.

FIG. 1 shows a schematically indicated vehicle 11 with a transmission arrangement for use with a method according to the invention. The vehicle 11 is provided with an internal combustion engine (ICE) 12 connected to a transmission 13 comprising a clutch arrangement 15, for transmitting torque to an output drive shaft (not shown). The ICE 12 is connected to a radiator arrangement 14 for cooling engine coolant and oil from the ICE 12 and the transmission 13. The transmission 13 is controlled by the driver or automatically via an electronic control unit (ECU) 16. The ECU 16 is provided with control algorithms for controlling the transmission independently during, for instance, an engine start requested by the driver. The transmission is controlled to select a gear ratio between the engine 12 and a pair of driven wheels 17.

Figure 2:
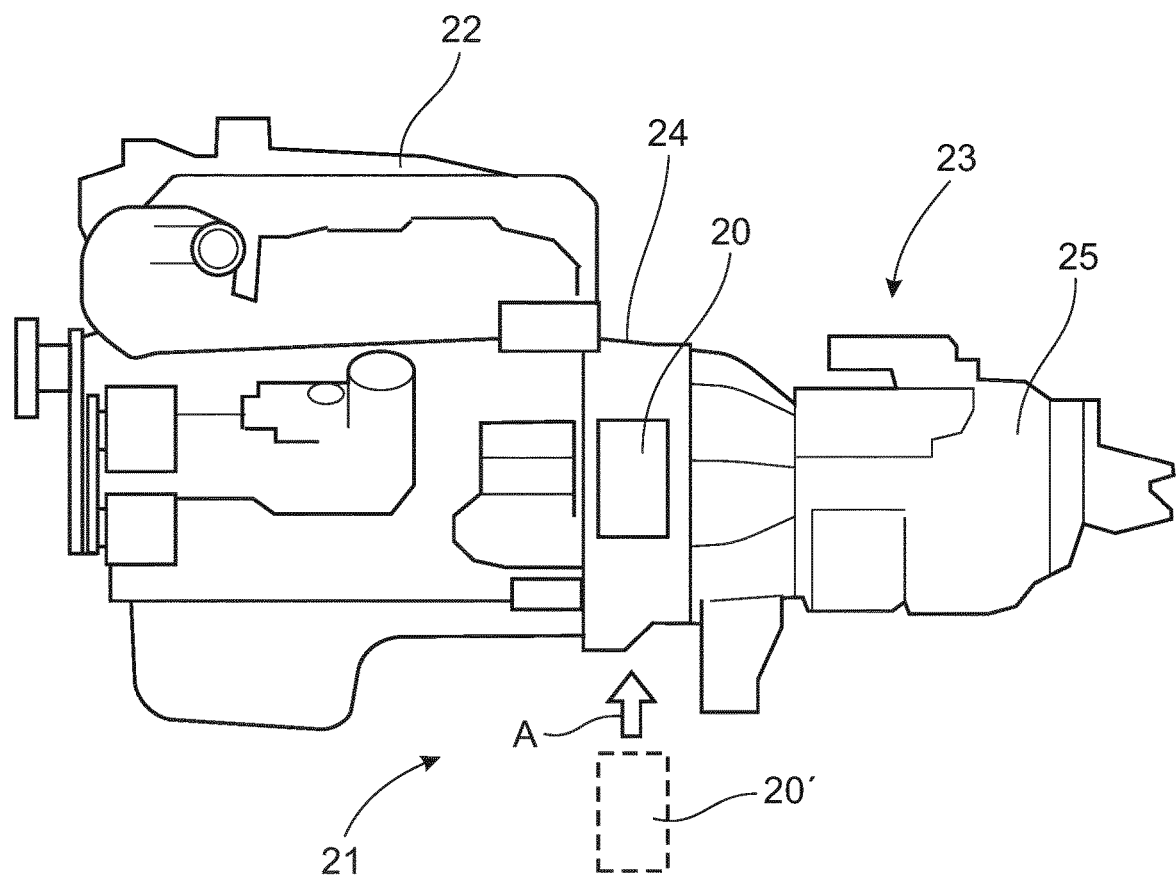
FIG. 2 shows a schematic engine and transmission assembly comprising a clutch valve unit according to the invention.

FIG. 2 shows a schematic engine 22 and transmission 23 assembly 21 comprising a clutch control unit, such as a unit clutch valve unit 20, according to the invention. In the subsequent text reference will be made to a method for assembling a clutch control unit in the form of a clutch valve unit. As indicated in FIG. 2, the clutch valve unit 20 is attached to one side of a clutch housing (not shown) within an outer transmission housing 23 comprising a transmission clutch housing 24, enclosing the clutch housing for a clutch actuator and the clutch valve unit 20, and a general transmission housing 25 enclosing the gearing, counter shaft brake, the gear shift actuators and other related components. In its operative position, the clutch valve unit 20 is fixed to the clutch housing to supply at least a clutch cylinder and a counter shaft brake actuator (not shown) with fluid pressure via suitable fluid connectors. In this position, the clutch valve unit is also connected to at least one sensor (not shown) in the transmission via suitable electrical connectors (see FIGS. 4A & 5A).

When assembling the clutch valve unit 20 into the transmission clutch housing 24, the clutch valve unit 20 insertion direction can be from a first position below the transmission clutch housing as mounted in the vehicle. This is often the case when the engine and transmission is mounted between beams making up the vehicle chassis, as indicated in FIG. 1. One possible first position of the clutch valve unit 20' is indicated by dashed lines in FIG. 2, and the initial insertion direction from this position is indicated by the arrow A.

FIGS. 3A-3C show schematic views of a transmission clutch housing 31 in a vehicle transmission indicating a clutch valve unit 30 during mounting onto a clutch housing 32 using the assembly method according to the invention. The transmission clutch housing 31 and the clutch valve unit 30 are provided with cooperating guide means comprising a first guide means 33 comprising a first pin 34 and a first slot 35 arranged in facing surfaces of the transmission clutch housing 31 and the clutch valve unit 30, respectively. A second guide means 36 comprises a second pin 37 and a second slot 38 similarly arranged in facing surfaces of the transmission clutch housing 31 and the clutch valve unit 30, respectively, on one or both sides thereof. Within the scope of the invention, one component can be provided with pins only, while the other component comprises slots only. Alternatively, a combination of pins and slots can be provided on either component, on one or both sides thereof.

FIG. 3A shows the clutch valve unit 30 in its first position prior to an initial displacement in a first displacement direction A1. In this position, the first pin 34 is aligned with the opening of a first section 35' of the first slot 35 in the outer surface of the transmission clutch housing 31. FIG. 3B shows the clutch valve unit 30 displaced from its first position into an intermediate position. In this position, the first pin 34 has been displaced in the direction of the arrow A2 to the end of the first section 35' of the first slot 35. At the same time, the second pin 37 has been aligned with the opening of a first section 38" of the second slot 38 in the outer surface of the transmission clutch housing 31. Continued displacement of the clutch valve unit 30 requires simultaneous displacement and rotation of the clutch valve unit 30 as indicated in FIG. 3C. In FIG. 3C the first pin 34 has been rotated and displaced in the direction of the arrow A3 into a second section 35" of the first slot 35. At the same time, the second pin 37 has been rotated and displaced in the direction of the arrow A3 from the first section 38' and into a second section 38" of the second slot 38. As indicated in FIG. 3C, the clutch valve unit 30 is now located so that it can be displaced along the parallel second sections 35", 38" of the first slot 35 and the second slot 38, respectively, into its operative, second position (see FIG. 4A).

In order to perform the above displacement, a mechanic is merely required to position the clutch valve unit in its first position and allow the first and the second guide means to guide the clutch valve unit along a predetermined displacement path inside the transmission clutch housing into its operative second position. This assembly can be performed without requiring special tools and allows the mechanic to correctly position the clutch valve unit by hand.

Figure 4A:
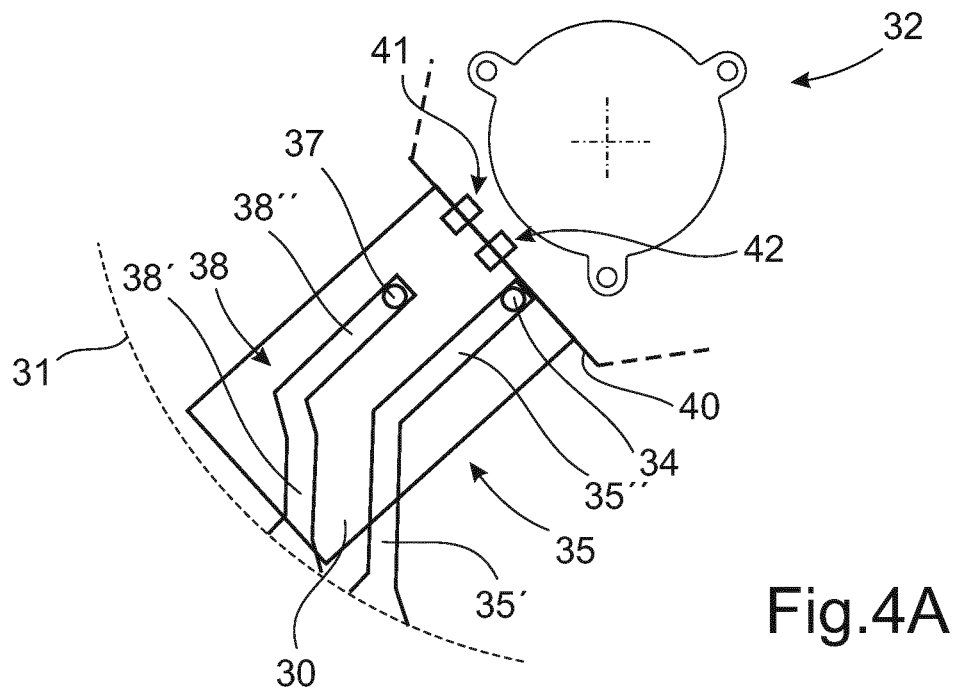
FIG. 4A shows a schematic illustration of a first alternative clutch valve unit in its operative second position.

FIG. 4A shows a schematic illustration of a first alternative clutch valve unit 30 in its operative second position inside the transmission clutch housing 31. In FIG. 4A the first pin 34 has reached the end of the second section 35" of the first slot 35 at the same time as the second pin 37 has reached the end of the second section 38" of the second slot 38. In this position, an end surface of the clutch valve unit 30 is in contact with a receiving, matching surface 40 on the clutch housing 32. The matching surfaces have a common interface for fluid and electrical connectors. The matching surface for the clutch valve unit may be the clutch housing, according to this example. The clutch valve unit is not necessarily mounted directly on the clutch housing. Alternatively, a matching surface can be located directly on the clutch concentric actuator, or be provided by an adapter or connection part between the clutch valve unit and the clutch concentric actuator. Such an adapter/connector can be made from plastic or metal. According to a further alternative, a matching surface and a common interface for the clutch valve unit can also be provided on the countershaft brake cover.

During the last part of the displacement, cooperating fluid connectors 41 (one shown) on the clutch valve unit 30 and the clutch housing 32, respectively, are connected to establish fluid communication between a source of fluid pressure and fluid pressure consumers in the transmission clutch housing. At the same time, cooperating electrical connectors 42 (one shown) on the clutch valve unit 30 and the clutch housing 32, respectively, are connected to establish electrical connection between an electronic control unit (see FIG. 1) and electrical actuators and sensors in the transmission clutch housing. Sealing means is provided between the unit 30 and receiving surface 40 and/or around the fluid connector(-s) 41 for fluid pressure and electrical connectors 42 for control and sensor signals.

Figure 4B:
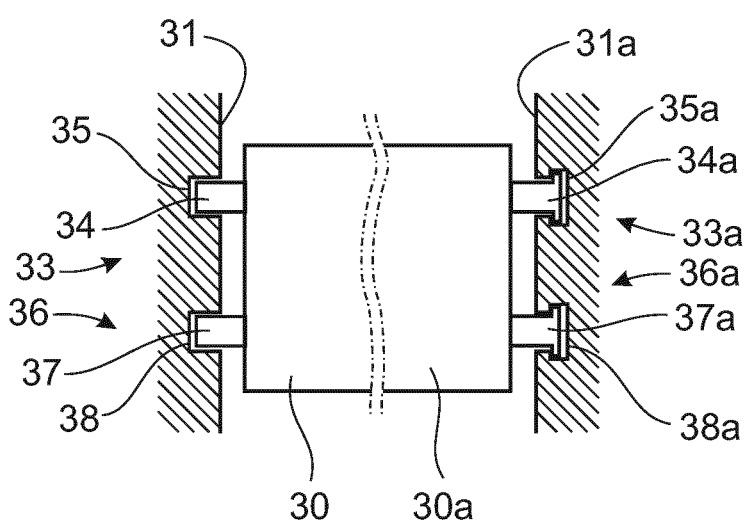
FIG. 4B shows alternative examples of guide means according to the invention.

FIG. 4B shows alternative examples of guide means according to the invention. The left-hand side of FIG. 4B shows a first guide means 33 comprising a first pin 34 and a first slot 35 arranged in facing surfaces of the clutch valve unit 30 and the transmission clutch housing 31, respectively. A second guide means 36 comprises a second pin 37 and a second slot 38 similarly arranged in facing surfaces of the clutch valve unit 30 and the transmission clutch housing 31, respectively. In this example, the cooperating pins and slots have a generally straight shape. The pins preferably have a circular or rounded cross-section to facilitate displacement through the slots.

The right-hand side of FIG. 4B shows an alternative first guide means 33a comprising a first pin 34a and a first slot 35a arranged in facing surfaces of the clutch valve unit 30a and the transmission clutch housing 31a, respectively. A second guide means 36a comprises a second pin 37a and a second slot 38a similarly arranged in facing surfaces of the clutch valve unit 30a and the transmission clutch housing 31a, respectively. In this example, the free ends of the pins have an enlarged head and the cooperating slots have a corresponding T-shaped cross-section. The pins preferably have a circular or rounded cross-section to facilitate displacement through the slots.

Figure 5A:
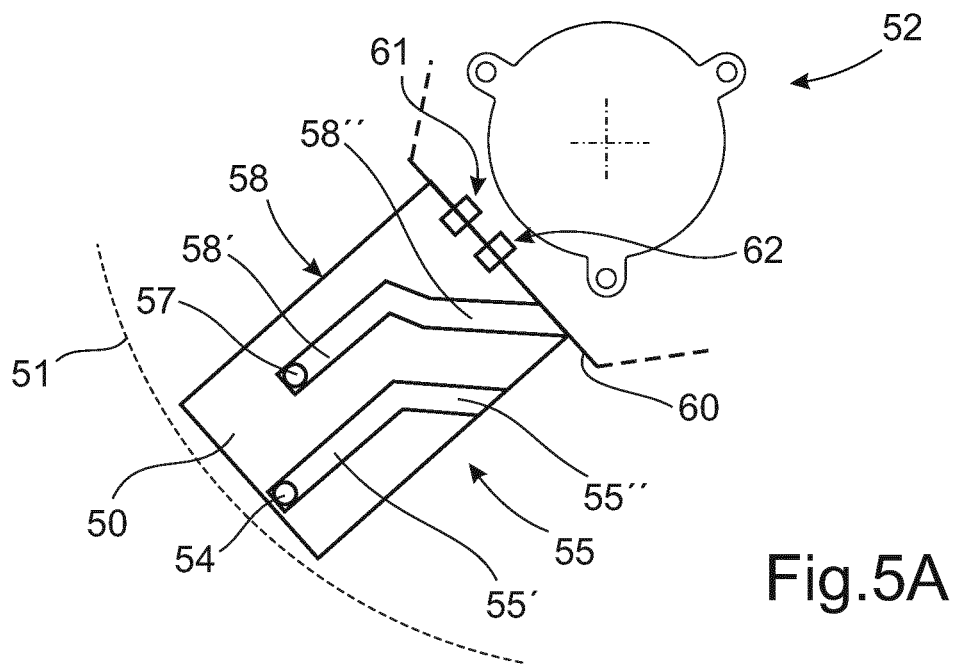
FIG. 5A shows a schematic illustration of shows a second alternative clutch valve unit in its operative second position.

FIG. 5A shows a schematic illustration of a second alternative clutch valve unit 30 in its operative second position inside the transmission clutch housing 31. In FIG. 5A the first pin 54 is located at the end of the second section 55" of the first slot 55 and the second pin 57 is located at the end of the second section 58" of the second slot 58. In this position, an end surface of the clutch valve unit 50 is in contact with a receiving surface 60 on the clutch housing 52. During the last part of the displacement, cooperating fluid connectors 61 (one shown) on the clutch valve unit 50 and the clutch housing 52, respectively, are connected to establish fluid communication between a source of fluid pressure and fluid pressure consumers in the transmission clutch housing. At the same time, cooperating electrical connectors 62 (one shown) on the clutch valve unit 30 and the clutch housing 52, respectively, are connected to establish electrical connection between an electronic control unit (see FIG. 1) and electrical actuators and sensors in the transmission clutch housing. Sealing means is provided between the unit 50 and receiving, matching surface 60 and/or around the fluid connector(-s) 61 for fluid pressure and electrical connectors 62 for control and sensor signals. Alternative locations and the provision of matching surfaces and interfaces have been described in connection with FIG. 4A above.

Figure 5B:
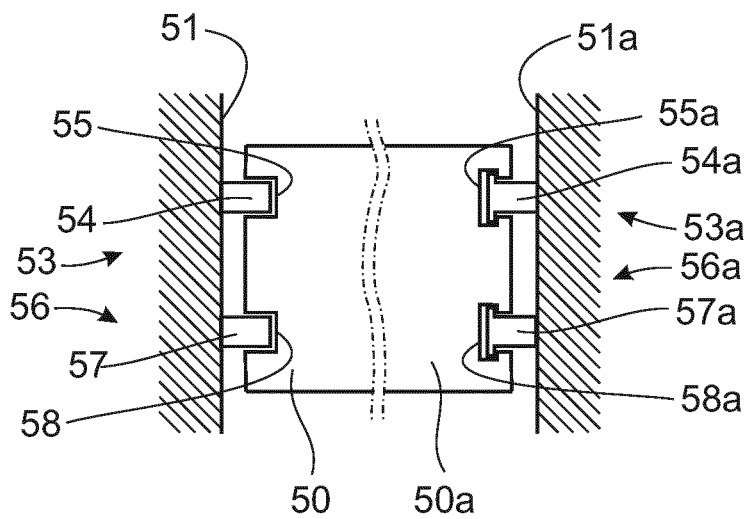
FIG. 5B shows further alternative examples of guide means according to the invention.

FIG. 5B shows further alternative examples of guide means according to the invention. The left-hand side of FIG. 5B shows a first guide means 53 comprising a first pin 54 and a first slot 55 arranged in facing surfaces of the transmission clutch housing 51 and the clutch valve unit 50, respectively. A second guide means 56 comprises a second pin 57 and a second slot 58 similarly arranged in facing surfaces of the transmission clutch housing 51 and the clutch valve unit 50, respectively. In this example, the cooperating pins and slots have a generally straight shape. The pins preferably have a circular or rounded cross-section to facilitate displacement through the slots.

The right-hand side of FIG. 5B shows an alternative first guide means 53a comprising a first pin 54a and a first slot 55a arranged in facing surfaces of is located at the end of the transmission clutch housing 51a and the clutch valve unit 30a, respectively. A second guide means 56a comprises a second pin 57a and a second slot 58a similarly arranged in facing surfaces of the transmission clutch housing 51a and the clutch valve unit 50a, respectively. In this example, the free ends of the pins have an enlarged head and the cooperating slots has a corresponding T-shaped cross-section. The pins preferably have a circular or rounded cross-section to facilitate displacement through the slots.

It is to be understood that the present invention is not limited to the embodiments described above and illustrated in the drawings; rather, the skilled person will recognize that many changes and modifications may be made within the scope of the appended claims.

The invention claimed is:

1. Transmission clutch housing (24; 31) in a vehicle transmission comprising a clutch control unit (30; 30a; 50; 50a), where the transmission clutch housing (24; 31) and the clutch control unit (30; 30a; 50; 50a) have cooperating guide means comprising: a first guide means (33) comprising at least a first pin (34; 34a; 54; 54a) and a first slot (35; 35a; 55; 55a) arranged in facing surfaces of the transmission clutch housing (24; 31) and the clutch control unit (30; 30a; 50; 50a), respectively; and a second guide means (36) further comprising at least a second pin (37; 37a; 57; 57a) and a second slot (38; 38a; 58; 58a) arranged in facing surfaces of the transmission clutch housing (24; 31) and the clutch control unit (30; 30a; 50; 50a), respectively; and wherein the first and second guide means (33, 36) are arranged to define a predetermined path followed by the clutch control unit (30; 30a; 50; 50a) during assembly of the clutch control unit (30; 30a; 50; 50a) into its operative position in the transmission clutch housing (24; 31), wherein the first and second slots (38; 38a; 58; 58a) defining the predetermined path are at least partially non-linear and comprise parallel and non-parallel segments.

2. Transmission clutch housing (24; 31) according to claim 1, wherein the clutch control unit is arranged between spaced apart, facing first and second surfaces in the transmission clutch housing (24; 31), which surfaces are located in radial planes relative to the rotational axis of a clutch enclosed by the transmission clutch housing (24; 31).

3. Transmission clutch housing (24; 31) according to claim 1, wherein at least one side of the clutch control unit (30; 30a; 50; 50a) comprises the first guide means (33).

4. Transmission clutch housing (24; 31) according to claim 1, wherein at least one side of the clutch control unit (30; 30a; 50; 50a) comprises the second guide means (36).

5. Transmission clutch housing (24; 31) according to claim 1, wherein the first and the second guide means (36) are arranged on the same side or on opposite sides of the clutch control unit (30; 30a; 50; 50a).

6. Transmission clutch housing (24; 31) according to claim 1, wherein the first and second slots (38; 38*a*; 58; 58*a*) are spaced apart along their entire extension.

7. A vehicle characterized in that it comprises the transmission clutch housing (24; 31) according to claim 1.

8. Clutch control unit (30; 30*a*; 50; 50*a*) in a transmission clutch housing (24; 31) in a vehicle transmission, which clutch control unit (30; 30*a*; 50; 50*a*) is arranged to be inserted into the transmission clutch housing (24; 31) from a first position at least partially outside the transmission clutch housing (24; 31) to an operative second position within the transmission clutch housing (24; 31), where the clutch control unit (30; 30*a*; 50; 50*a*) is provided with one part of a first guide means (33) comprising a first pin (34; 34*a*; 54; 54*a*) or a first slot (35; 35*a*; 55; 55*a*) and one part of a second guide means (36) comprising a second pin (37; 37*a*; 57; 57*a*) or a second slot (38; 38*a*; 58; 58*a*); and wherein the first and second guide means (36) are arranged to define a predetermined path followed by the clutch control unit (30; 30*a*; 50; 50*a*) during assembly of the clutch control unit (30; 30*a*; 50; 50*a*) into its operative position in the transmission clutch housing (24; 31) the first and second slots (38; 38*a*; 58; 58*a*) defining the predetermined path are at least partially non-linear wherein the first and second slots (38; 38*a*; 58; 58*a*) defining the predetermined path are at least partially non-linear and comprise parallel and non-parallel segments.

9. Clutch control unit (30; 30*a*; 50; 50*a*) according to claim 8, wherein one part of the first guide means (33) is provided on one or on opposite sides of the clutch control unit (30; 30*a*; 50; 50*a*).

10. Clutch control unit (30; 30*a*; 50; 50*a*) according to claim 8, wherein one part of the second guide means (36) is provided on one or on opposite sides of the clutch control unit (30; 30*a*; 50; 50*a*).

* * * * *